United States Patent Office 3,278,608
Patented Oct. 11, 1966

3,278,608
PROCESS FOR MANUFACTURING ALPHA-ETHYLENIC ALCOHOLS
Geneviève Clement, Coeuilly-Champigny, France, assignor to Institut Francais du Petrole des Carburants et Lubrifiants, Rueil-Malmaison, Seine-et-Oise, France
No Drawing. Filed Dec. 3, 1962, Ser. No. 241,527
Claims priority, application France, Mar. 10, 1962, 890,672
10 Claims. (Cl. 260—617)

This invention relates to a process for manufacturing alpha-ethylenic alcohols. These alcohols are valuable raw materials in organic synthesis. For instance, their dehydration yields conjugated diolefins which are used for manufacturing synthetic rubbers.

A known process for manufacturing these alcohols consists of subjecting hydroperoxides to a heating treatment or to the action of chemical agents. These hydroperoxides are obtained from the oxidation of ethylenic hydrocarbons by oxygen or an oxygen-containing gas such as air, under moderate temperature.

However, the conventional processes for converting alpha-hydroperoxides of ethylenic hydrocarbons to the corresponding alpha-ethylenic alcohols suffer from various drawbacks. As a matter of fact, some of these processes require the consumption of relatively costly reducing agents such as sodium sulfite or potassium iodide, whereas those processes which do not consume these reducing agents result in unsatisfactory yields and purities of the produced ethylenic alcohols.

In this connection it must be emphasized that the use of costly reducing agents in present industrial processes confirms the fact that no satisfactory process for industrial operation has been yet discovered, which may be carried out with hydrogen, which is of course a very inexpensive reducing agent.

As a matter of fact, it has been observed that the hydrogenation catalysts previously proposed for conducting the reduction of hydroperoxide are not satisfactory since on the one hand, they are either efficient only at high temperatures, for instance above 80° C., at which the alpha-hydroperoxides of olefins are decomposed to undesirable products such as aldehydes or ketones in particular, or on the other hand, they provide insufficient selectivity, i.e. they reduce the ethylenic double bond together with the hydroperoxide group, which results in the formation of excessive quantities of saturated alcohols.

Moreover, in most cases the alpha-hydroperoxide of an olefin is in the form of a solution in the corresponding olefin and the low selectivity of the reaction also results in a substantial concomitant hydrogenation of the double bond of said olefin, which constitutes an additional drawback of the conventional catalysts.

Thus, for instance, such catalysts as palladium, platinum, and nickel have proved to be industrially uneconomical due to their insufficient selectivity in the considered reaction.

It is, therefore, an object of this invention to avoid the drawbacks of the non-catalytic processes for the conversion of the alpha-hydroperoxides of olefins to the corresponding alpha-ethylenic alcohols, and particularly to avoid the consumption of substantial amounts of relatively expensive reducing agents.

It is another object of this invention to provide for the manufacture of alpha-ethylenic alcohols from the corresponding alpha-hydroperoxides with a sufficient yield and degree of purity to comply with the industrial requirements.

It is still another object of this invention to provide for the conversion of olefinic alphahydroperoxides to the corresponding alpha-ethylenic alcohols by hydrogen under such conditions that no substantial amount of undesirable by-products is formed during the reaction as a result of a thermal decomposition of said alpha-hydroperoxides.

A still further object of this invention is to provide for the conversion of alpha-hydroperoxides of olefins to the corresponding alpha-ethylenic alcohols by hydrogen in the presence of a catalyst favoring the reduction of the alpha-hydroperoxide group with respect to that of the ethylenic double bond, whereby any substantial formation of undesirable by-products is avoided.

These and other objects and advantages of this invention as may be apparent from the following specification and claims are achieved by the process of this invention, which comprises contacting gaseous hydrogen with an alpha-hydroperoxide of an olefinic hydrocarbon, dissolved into a liquid hydrocarbon, in the presence of a catalyst of palladium-lead, palladium-bismuth or palladium-lead-bismuth, said liquid hydrocarbon also containing in a dissolved state, an organic nitrogeneous base and a hydrophillic solvent.

The present process may be applied to the hydroperoxides of aliphatic or alicyclic olefinically-unsaturated hydrocarbons containing for instance from 4 to 20 carbon atoms, although alpha-hydroperoxides of hydrocarbons having more than 20 carbon atoms, may also be treated without difficulty. However, it is for the treatment of hydroperoxides of ethylenic hydrocarbons containing from 4 to 6 carbon atoms that the present process offers the maximum of benefits. It is particularly advantageous for the treatment of alpha-hydroperoxides of butenes, pentenes, hexenes and specially for the treatment of the alpha-hydroperoxide of cyclohexene.

The process of the present invention is, however, also beneficial when applied to alpha-hydroperoxides of such ethylenic hydrocarbons as heptenes, cyclo-octene, dodecene and eicosene, for instance.

The hydrocarbon wherein is dissolved the alpha-hydroperoxide may be selected from the group of saturated and/or ethylenic, aliphatic and/or alicyclic hydrocarbons or mixtures thereof, and other equivalent solvents such as aromatic or alkylaromatic hydrocarbons, as well as halogen-derivatives thereof.

These hydrocarbons are preferably those containing from 4 to 12 carbon atoms per molecule and must exist in the liquid state under the temperature and pressure reaction conditions of this invention. There may be used, by way of example, butane, hexane, dodecane, cyclohexane, decahydronaphthalene, heptene, cyclohexene, benzene, xylene, monochlorobenzene, orthodichlorobenzene, or mixtures thereof.

According to a particular embodiment of this invention there may be used, as the solution of the alpha-hydroperoxide in a hydrocarbon, the raw product of the hydroperoxidation reaction of the ethylenic hydrocarbon, which raw product consists of a solution of the ethylenic alpha-hydroperoxide in the corresponding unconverted ethylenic hydrocarbon. It has been observed that said hydrocarbon is substantially inert with respect to hydrogen under the reaction conditions. In view of the fact that a hydrogenation of the double bond of said ethylenic hydrocarbon was to be expected in a hydrogenation process, the fact that the double bond is not hydrogenated is surprising, and an advantageous feature which makes possible the treatment of the raw product of the hydroperoxidation without requiring the preliminary removal of the unconverted ethylenic hydrocarbon.

The alpha-hydroperoxide concentration in the hydrocarbon solution may be, for instance, comprised between 2 and 85% by weight.

The catalyst may be prepared by reduction of an oxide, hydroxide or a salt of palladium, preferably palladium chloride, dissolved or suspended in an aqueous phase, the reduction being achieved in a conventional manner by means of hydrogen or a chemical reducing agent such as, for instance, sodium formate. During, or preferably after this reduction step, the resulting palladium metal is contacted with a solution of a salt of lead and/or bismuth in a convenient solvent, for instance an aqueous solution of lead or bismuth acetate or nitrate, the weight ratio on a dry basis of the palladium to the lead or bismuth salt is preferably about 100 parts palladium to about 10–1,000 parts salt.

The resulting catalyst is thereafter separated from the above-mentioned solution and may be used directly or, preferably, after drying same.

The catalyst may be used as such, or deposited on an inert carrier such as, for instance, alumina or calcium carbonate. When a carrier is used, it may be impregnated with a solution of a salt or palladium; and the impregnated carrier will be subjected to a reduction preferably prior to the treatment by a salt of lead and/or bismuth as already mentioned. The manufacture of these catalysts may be carried out according to the teaching of the British Patent 13,298/1915.

As bismuth salts, there may be used, for example, the acetate, citrate, or oxalate. The nitrate however is preferred.

As lead salts, it is convenient to use, for example, the formiate, naphthenate, oxalate or nitrate. The acetate however is preferred.

For conducting the reaction, a catalytic amount of the palladium catalyst is all that is necessary, and in this case a concentrate even lower than 0.01% by weight of the treated alpha-hydroperoxide results in discernible catalytic activity.

There is also introduced in the reaction medium an organic nitrogenous base being defined as any organic compound containing at least carbon, hydrogen and nitrogen in the molecule and convertible to salts by reaction with strong acids such as, for instance, hydrochloric acid or sulfuric acid. Obviously then, this organic base includes all primary, secondary and tertiary amines.

Preferably, this organic nitrogenous base is an organic compound containing, for instance, from 2 to 30 carbon atoms per molecule and in particular selected from the group consisting of aliphatic, cycloaliphatic, aromatic, araliphatic, and mixed amines, and as well as heterocyclic compounds containing at least one nitrogen atom in the ring. By way of example of such compounds, there may be mentioned the following: n-hexylamine, diethylamine, isopropylamine, triethylamine, hexamethylenediamine, diethanolamine, allylamine, cyclohexylamine, dicyclohexylamine, aniline, paraphenylene-diamine, dimethylaniline, benzylamine, alpha-naphthyl-benzyl-amine, phenyl-alpha-naphthylamine, pyrrolidine, piperidine, morpholine, piperazine, pyridine, amino-3-pyridine, quinoline, isoquinoline, acridine, pyrimidine, and the like.

It has been discovered, moreover, that of all the organic nitrogenous bases quinoline is preferred since it provides the maximum selectivity to the catalyst.

Also, instead of adding an organic nitrogenous base as hereinabove defined to the catalyst before the reaction takes place, certain compounds which are reduced "in situ" by hydrogen to such an organic nitrogenous base, such as for instance nitrobenzenes may be employed.

These bases are preferably introduced directly in the hydrocarbon having the alpha-hydroperoxide dissolved therein, in proportion of for example 0.01 to 10 g. per liter and preferably 0.05 to 1 g. per liter of said solution, although it is also possible to subject the catalyst to a treatment by these bases prior to its use.

The use of the organic nitrogen-containing base is essential to this invention, as in the absence thereof, there is obtained from the reaction an undesirable mixture of ethylenic alcohol with significant quantities of saturated alcohol; and furthermore, when an ethylenic hydrocarbon is used as a solvent for the alpha-hydroperoxide, the olefin is deleteriously hydrogenated to the saturated hydrocarbon.

Additionally, it is necessary to use an organic solvent for both the alpha-hydroperoxide and the hydrocarbon, which is hydrophilic, i.e. which may dissolve at a temperature of 20° C. an amount of water corresponding to at least about 10% of its weight. Innumerable solvents fitting this description can be selected from chemical handbooks, books on solvents, and the like, so no attempt will be made herein to list all possible solvents categorically. Of these hydrophilic solvents, it however is preferred to employ an oxygenated solvent, entirely miscible with water. Examples are methyl alcohol, ethyl alcohol, isopropyl alcohol, acetone, dioxane, ethyl ether or ethyl acetate.

The above-mentioned hydrophilic organic solvent for the alpha hydroperoxide and the hydrocarbon will preferably also have sufficient dissolving power to dissolve an amount of the hydrocarbon-hydroperoxide mixture corresponding to at least 2% of its weight, at a temperature of 20° C.

The hydrophilic solvent will be preferably used in sufficient concentration to maintain a single liquid phase throughout the reaction, particularly towards the end of the reaction, a simple trial or two being all that is necessary to determine an operable concentration for the maintenance of a single phase. An amount of, for instance, 0.1 to 100 times, and preferably of 1 to 10 times, the weight of the treated alpha-hydroperoxide will be convenient, the amount of the hydrophilic solvent being proportionally higher for the treatment of a given weight of alpha-hydroperoxide, when the latter is dissolved in a higher amount of hydrocarbon.

The selected hydrophilic solvent will be preferably inert to the action of hydrogen as it is in the case of the above-mentioned preferred hydrophilic solvents.

The reaction temperature will be moderate, in most cases lower than 50° C., and preferably comprised between 5 and 40° C., the best results being achieved at temperatures in the range of from 10° to 25° C.

The pressure may be selected at any level sufficient to maintain the reactants in the liquid state and to provide for a substantial hydrogen concentration, for example a partial pressure of hydrogen of at least 0.1 atm. in the reaction medium. Thus, by way of example, good results are obtained with pressures in the range of 0.5 to 10 atmospheres absolute. For practical purposes, atmospheric pressure is thus quite suitable.

The theoretical amount of hydrogen required for carrying out the present process is of one mole of hydrogen per mole of mono-alpha-hydroperoxide of the ethylenic hydrocarbon.

The reaction is generally continued until there is an absorption of an amount of hydrogen corresponding to 90% to 100%, and preferably 95% to 100% of the theoretical amount required for the reduction of the alpha-hydroperoxide to the corresponding ethylenic alcohol. The reaction may, however, be continued in some cases until there is an absorption of an amount of hydrogen slightly exceeding 100% of the theoretical amount, for instance, up to 110%, in order to take into account the supplemental consumption which may result eventually from secondary reactions occurring to a small extent.

It is noticeable that the rate of absorption of hydrogen with respect to time decreases substantially in the vicinity of the above-mentioned values, i.e. 90–110%, which thereby facilitates the termination of the reaction at the best time. As a matter of fact, if the reaction is terminated at the moment when the hydrogen absorption is not substantially different from the above-mentioned values, the yield of the process will not be significantly less than optimum.

The hydrogen supply is then interrupted, and the alpha-ethylenic alcohol is separated from the reaction mixture in a conventional manner, for instance, by distillation.

It must be observed that the catalysts used according to this invention are substantially inert with respect to the alpha-hydroperoxide in the absence of hydrogen. They, therefore, act exclusively as hydrogenation catalysts.

The following specific preferred embodiments are not to be taken as in any way limiting the scope of the present invention, as they are merely exemplary in nature.

Preparation of the catalysts:

CATALYST A

At a temperature of about 80° C., an aqueous solution of sodium hydroxide is poured into 100 g. of an aqueous solution, containing 3% by weight of palladium chloride, until complete precipitation of the palladium hydroxide occurs. Hydrogen is then passed therethrough until there is a termination of hydrogen absorption. The precipitate is then filtered, washed with water, suspended into 100 cc. of water, and admixed with 15 g. of an aqueous solution having a 30% by weight content of lead acetate. After stirring for one hour at ambient temperature and thereafter at 90° C., the catalyst is filtered, washed and dried.

CATALYST B 25 g. of alumina pellets are impregnated with 25 cc. of an aqueous solution of palladium chloride having a 5% palladium content, at ambient temperature for 62 hours and thereafter at 80–90° C. for 5 hours.

After filtration and drying, the impregnated alumina is reacted with hydrogen for one hour at a temperature of 80–90° C.

The pellets are then immersed into a solution of 5 g. of lead acetate in 25 cc. of water. After 2 hours, the catalyst is filtered and dried at the ambient temperature.

CATALYST C 20 cc. of an aqueous solution of palladium chloride having a 5% palladium content are diluted with 180 cc. of hot water. There are then added thereto an aqueous solution of 5% sodium hydroxide up to complete precipitation of palladium hydroxide and thereafter, drop-by-drop, an aqueous solution having a 22% by weight content of sodium formate, until complete reduction of the palladium is achieved. The latter is then washed with water and suspended into 20 cc. of water. To this suspension are added 1 g. of bismuth nitrate and 7 cc. of 5 N hydrochloric acid. The resulting mixture is vigorously stirred at a temperature of 90° C. and after filtration, the catalyst is washed with water and dried.

CATALYST D 20 g. of precipitated calcium carbonate are suspended into 50 cc. of water. There are added 20 cc. of an aqueous solution of palladium chloride containing 5% by weight of palladium. The mixture is stirred for 10 minutes at 80° C. An aqueous solution of sodium formate (1 cc. of formic acid+30 cc. of 5% by weight aqueous sodium hydroxide) are added at 80° C. The solids are washed with water and then suspended into 100 cc. of water. To the agitated suspension, there is added 1 g. of bismuth nitrate and 1 g. of lead acetate. The mixture is agitated for 5 minutes at 20° C. and 30 minutes at 90° C. The resulting catalyst is washed with water and dried under reduced pressure at about 30° C.

Example 1

There are admixed 20 cc. of ethanol, 0.02 g. of quinoline, 4.1 g. of pure alpha-hydroperoxide of cyclohexene contained in a 56% by weight solution of said alpha hydroperoxide in cyclohexene, 0.01 g. of the above-mentioned A catalyst and cyclohexene up to a total volume of the mixture of 50 cc.

Hydrogen is introduced into the vessel containing the resulting mixture maintained at a temperature of 25° C. After 17½ minutes of stirring, 0.027 mole of hydrogen (¾ of the theoretical amount required for the conversion to alpha-cyclohexenol) is absorbed, which corresponds to an absorption rate of 9.2 moles per gram of catalyst per hour. This velocity then decreases down to 0.5 mole per gram of catalyst per hour when the theoretical amount of hydrogen, i.e. 0.036 mole, has been absorbed, which requires one hour of reaction.

The hydrogen supply is then interrupted. The alpha-hydroperoxide determination shows that the conversion of the latter is substantially complete. The analysis of the reaction product, conducted by vapor-phase chromatography gave the following results:

| Component: | Molar yield, percent |
| --- | --- |
| cyclohexenol | 84 |
| cyclohexenone | 12 |
| cyclohexanol | 1.4 |
| cyclohexanone | 1.3 |

Example 2

For purposes of comparison, Example 1 is repeated with the same weight of a catalyst consisting of palladium without lead, and also in the absence of quinoline. The absorption of the theoretical amount of hydrogen requires 160 minutes. The absorption rate for the absorption of 75% of the theoretical amount of hydrogen is only of 1.41 mole per gram of catalyst per hour. Atfer absorption of the theoretical amount of hydrogen, i.e., after 160 minutes, the absorption velocity is still as high as 1.14 mole per gram of catalyst per hour. Thus in this experiment there is no substantial decrease in the rate of hydrogen absorption at the desirable time for terminating the reaction.

The conversion of the alpha-hydroperoxide is substantially complete and the analysis of the reaction product gave the following results:

| Component: | Molar yield, percent |
| --- | --- |
| cyclohexenol | 63 |
| cyclohexenone | 16.8 |
| cyclohexanol | 7 |
| cyclohexanone | 6.9 |

The results, as compared to those obtained according to Example 1 clearly show that palladium alone is a poor catalyst for the conversion of the olefin hydroperoxides to the corresponding olefinic alcohols since it exhibits both a lower activity and a lower selectivity than those of the palladium-lead catalyst according to this invention.

Example 2A

For purposes of comparison, Example 1 is repeated with the same weight of palladium without lead, in the presence of quinoline. The absorption of the theoretical amount of hydrogen requires 210 minutes. The absorption rate for the absorption of 75% of the theoretical amount of hydrogen is only 1.22 moles per gram of catalyst per hour. After absorption of the theoretical amount of hydrogen, the absorption velocity is still 0.65 mole per gram of catalyst per hour. Thus there is no substantial decrease in the rate of hydrogen absorption at the desirable time for terminating the reaction.

The conversion of the hydroperoxide is substantially complete and the analysis of the reaction product gave the following results:

| Component: | Molar yield, percent |
| --- | --- |
| Cyclohexenol | 68.7 |
| Cyclohexenone | 10 |
| Cyclohexanol | 5.9 |
| Cyclohexanone | 10 |

These results show that palladium alone, even in the presence of quinoline, is a poor catalyst for converting selectively olefin alpha-hydroperoxides into olefinic alcohols.

Example 3

Example 1 is repeated except that quinoline is used in an amount of 0.1 g. The reaction duration is then of 70 minutes. The yields are substantially unchanged.

Example 4

Example 1 is repeated except that quinoline is used in an amount of 0.165 g. The reaction duration is then of 90 minutes. The yields are substantially unchanged.

Example 5

Example 1 is repeated except that only 0.01 g. of quinoline is used. The reaction duration is then reduced to 50 minutes. The yields are substantially unchanged.

Example 5A

Example 1 is repeated except that quinoline is not used. The molar yield of cyclohexenol is only 78%.

Example 6

Example 1 is repeated except that quinoline is replaced by pyridine.

With 0.012 g. of pyridine the reaction lasts one hour. With 0.02 g. of pyridine the reaction lasts 70 minutes, whereas with 0.1 g. the reaction duration lasts 90 minutes.

The yields are substantially unchanged.

Examples 7 to 9

Example 1 is repeated three times with respective ethanol amounts of 10, 30, and 40 cc.

The results are substantially unchanged, thereby showing that the range of concentration of the hydrophilic solvent may be varied widely, and that an excess of several fold is not disadvantageous.

Example 10

Example 1 is repeated except that the ethanol amount is reduced to 5 cc. The reaction lasts 130 minutes and the catalyst forms an agglomerated mass, its activity being accordingly reduced. The catalyst cannot be used again for a further operation.

This experiment shows that in the presence of a substantial amount of hydrocarbon, it is disadvantageous to use too little hydrophilic solvent. A satisfactory amount of the hydrophilic solvent prevents agglomeration and subsequent deactivation of the catalyst, due to the splitting of the reaction mixture into two distinct liquid phases.

Example 11

Example 1 is repeated except that ethanol is replaced by an equal volume of methanol.

An induction period of a few minutes is observed, and thereafter, the reaction proceeds according to Example 1 and gives similar results.

Example 12

Example 1 is repeated except that quinoline is replaced by 0.013 g. of aniline.

The reaction lasts one hour and gives substantially the same yields as according to Example 1.

Example 13

Example 1 is repeated except that quinoline is replaced by 0.033 g. of alpha-naphthyl benzyl-amine.

The reaction lasts one hour and gives substantially the same yield as according to Example 1.

Example 14

Example 1 is repeated except that quinoline is replaced by 0.012 g. of diethylamine.

The reaction lasts one hour and gives substantially the same yield as according to Example 1.

Example 15

Example 1 is repeated except that ethanol is replaced by an equal volume of isopropanol.

The yields are unchanged.

Example 16

Example 1 is repeated except that ethanol is replaced by an equal volume of acetone. The hydrogenation reaction lasts 115 minutes and yields are substantially unchanged. (83% of alpha-cyclohexenol.)

Example 17

Example 1 is repeated except that quinoline is replaced by 0.015 g. of aniline. The reaction lasts 86 minutes and alpha-cyclohexenol is obtained with a molar yield of 86%.

Example 18

Example 1 is repeated except that quinoline is replaced by 0.015 g. of n-hexylamine. Alpha-cyclohexenol is obtained with a molar yield of 85%.

Example 19

Example 1 is repeated except that quinoline is replaced by 0.009 g. of isopropylamine.

Similar results as according to Example 18 are obtained after 127 minuutes.

Example 20

Example 1 is repeated except that quinoline is replaced by 0.03 g. of phenyl-alpha-naphthyl-amine.

Similar results as according to Example 18 are obtained after 70 minutes.

Example 21

Example 1 is repeated except that quinoline is replaced by 0.02 g. of nitrobenzene. Similar results to Example 18 are obtained after 45 minutes.

Example 22

Example 1 is repeated except that the catalyst A is replaced by the same weight of catalyst C (palladium-bismuth).

After the theoretical amount of hydrogen has been absorbed, which requres 200 minutes, the absorption velocity drops to a negligible value.

Alpha-cyclohexenol is thus obtained with a molar yield of 84%.

Example 23

Example 1 is repeated except that the catalyst A is replaced by 0.2 g. of a catalyst of palladium-lead-bismuth deposited on calcium carbonate (catalyst D).

After the theoretical amount of hydrogen has been absorbed, which requires 35 minutes, the absorption velocity drops to a negligible value. Cyclohexenol is obtained with a molar yield of 86%.

Example 24

Example 1 is repeated except that the catalyst A is replaced by 1.5 g. of the catalyst B (palladium-lead deposited on an alumina carrier).

After the theoretical amount of hydrogen has been absorbed, which requires 300 minutes, cyclohexenol is obtained with a molar yield of 87%.

Example 25

Example 1 is repeated at a temperature of 12° C. The yield is substantially unchanged but the absorption of the theoretical amount of hydrogen requires 300 minutes.

Example 26

Example 1 is repeated at a temperature of 40° C. The absorption of the theoretical amount of hydrogen requires 51 minutes.

Example 27

There are admixed 140 cc. of ethanol with 0.16 g. of quinoline, 29 g. of alpha-hydroperoxide of cyclohexene contained in a 56% by weight solution thereof in cyclohexene and 0.07 g. of catalyst A.

Cyclohexene is added to the mixture up to a total volume of the latter of 350 cc. Hydrogen is then passed through the resulting mixture maintained at a temperature of 25° C.

After one hour the theoretical amount of hydrogen is absorbed and the absorption velocity drops to a negligible value. At this instant 99.8% of the alpha-hydroperoxide has been converted. By distillation of the reaction mixture alpha-cyclohexenol is recovered with a molar yield of 84%.

Example 28

There are admixed 285 cc. of ethanol with 0.29 g. of quinoline, 57.2 g. of alpha-hydroperoxide of cyclohexene contained in a 56% by weight solution thereof in cyclohexene and 0.07 g. of catalyst A. Hydrogen is passed through the resulting mixture, maintained at a temperature of 25° C. The theoretical amount of hydrogen is absorbed in 165 minutes, the conversion of alpha-hydroperoxide reaching 98.6%. By distillation of the reaction mixture, alpha-cyclohexenol is recovered with a molar yield of 87%.

The above exemplified processes can be repeated with similar results by replacing the reactants, and solvents and catalyst compositions with any of those generically and specifically described in the body of the specification.

The general process of the invention may be illustrated by the following structural formulae:

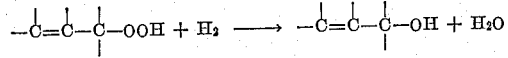

wherein the substituents of the carbon atoms are preferably hydrogen atoms, alkyl radicals, cycloalkyl radicals and/or aryl radicals, at least two carbon atoms of the formulae being optionally further linked together by an alkylene chain containing for example, 3 to 10 carbon atoms. Preferably the three carbon atoms of the formulae are part of a cycloolefinic ring.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for the manufacture of alpha-ethylenic alcohols, which process comprises catalytically reacting hydrogen with alpha-hydroperoxide of an olefinic hydrocarbon, said hydroperoxide being dissolved in a solution containing a liquid hydrocarbon solvent, a hydrophilic organic solvent capable of dissolving at least about 10% of its own weight of water at 20° C., a catalyst of palladium metal and at least one salt of a metal selected from the group consisting of lead and bismuth, and an organic nitrogenous base selected from the group consisting of aliphatic, cycloaliphatic, aromatic, araliphatic amines and heterocyclic compounds containing at least one nitrogen atom in the ring.

2. The process of claim 1, wherein the alpha-hydroperoxide contains 4–6 carbon atoms.

3. The process of claim 1, wherein the liquid hydrocarbon solvent is selected from the group consisting of paraffinic, olefinic, cycloparaffinic, cycloolefinic, aromatic and alkylaromatic hydrocarbons, halogen-substituted derivatives thereof and mixtures thereof.

4. The process of claim 1, wherein the alpha-hydroperoxide concentration in the liquid hydrocarbon solvent is about 2–80% by weight.

5. The process of claim 1, wherein the organic base is used in an amount of from 0.05 to 1 gram per liter of the alpha-hydroperoxide solution in the hydrocarbon.

6. The process of claim 1, wherein the hydrophilic solvent is selected from the group consisting of methanol, ethanol, isopropanol, acetone, ethyl ether and ethyl acetate.

7. The process of claim 1, wherein the amount of hydrophilic solvent is sufficient for maintaining a single liquid phase throughout the reaction.

8. The process of claim 1, wherein the weight of the hydrophilic solvent is in the range of from 0.1 to 100 times the weight of the alpha-hydroperoxide reactant.

9. The process of claim 1, wherein the reaction is conducted at a temperature up to 50° C.

10. The process of claim 1, wherein said reaction is continued until 90 to 110% of the theoretical amount of hydrogen is absorbed in the solution.

References Cited by the Examiner

UNITED STATES PATENTS 2,590,176   3/1952   Hawkins et al. _____ 260—617

OTHER REFERENCES

Coleman et al., Jr. Am. Oil Chemist Soc., vol. 32, pp. 221–4 (1955).

LEON ZITVER, *Primary Examiner.*

HAROLD G. MOORE, *Examner.*

M. B. ROBERTO, T. G. DILLAHUNTY,
*Assistant Examiners.*